United States Patent
Jiang (10) Patent No.: US 12,409,547 B2
(45) Date of Patent: Sep. 9, 2025

(54) CONTROL DEVICE AND CONTROL METHOD

(71) Applicant: FANUC CORPORATION, Yamanashi (JP)

(72) Inventor: Hangjie Jiang, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 338 days.

(21) Appl. No.: 18/025,063

(22) PCT Filed: Sep. 22, 2021

(86) PCT No.: PCT/JP2021/034770
§ 371 (c)(1),
(2) Date: Mar. 7, 2023

(87) PCT Pub. No.: WO2022/071058
PCT Pub. Date: Apr. 7, 2022

(65) Prior Publication Data
US 2023/0330838 A1    Oct. 19, 2023

(30) Foreign Application Priority Data
Sep. 29, 2020   (JP) ................................ 2020-163565

(51) Int. Cl.
*B25J 9/00* (2006.01)
(52) U.S. Cl.
CPC .................... *B25J 9/0081* (2013.01)
(58) Field of Classification Search
USPC ................................................ 700/245–264
See application file for complete search history.

(56) References Cited

U.S. PATENT DOCUMENTS

| | | | |
|---|---|---|---|
| 5,956,465 A * | 9/1999 | Takagi | G05B 19/41815 700/250 |
| 6,430,472 B1 * | 8/2002 | Boillot | G05B 19/056 901/41 |

(Continued)

FOREIGN PATENT DOCUMENTS

| | | |
|---|---|---|
| DE | 20 2007 010 097 | 12/2007 |
| JP | 08-141969 | 6/1996 |

(Continued)

OTHER PUBLICATIONS

International Search Report issued Nov. 30, 2021, in International (PCT) Application No. PCT/JP2021/034770, with English translation.

*Primary Examiner* — Jonathan L Sample
(74) *Attorney, Agent, or Firm* — Wenderoth, Lind & Ponack, L.L.P.

(57) ABSTRACT

A control device controls a robot and an articulated shaft of the robot, the articulated shaft being attached to the distal end of an arm of the robot. The control device includes an operation program analysis unit that calculates a movable range of a combination of the robot and articulated shaft based on an operation program, and a robot/tool moving distance calculation unit that, based on the calculated movable range, sets an amount of movement of the articulated shaft for moving the articulated shaft to a boundary position as a specified value, and calculates the amount of movement of the distal end of the arm when the articulated shaft is moved to the boundary position, and the amounts of movement of the articulated shaft and the distal end of the arm of the robot for at least one teaching point other than the boundary position.

5 Claims, 9 Drawing Sheets

(56) References Cited

U.S. PATENT DOCUMENTS

| | | | |
|---|---|---|---|
| 8,916,791 B2* | 12/2014 | Gatlin | B23K 9/0286 |
| | | | 219/60 R |
| 9,733,646 B1* | 8/2017 | Nusser | B65G 57/03 |
| 10,920,434 B1* | 2/2021 | Pearson, Jr. | E04G 21/22 |
| 11,331,799 B1* | 5/2022 | Shafer | B25J 9/1664 |
| 2019/0224845 A1* | 7/2019 | Shinagawa | G05B 19/41825 |
| 2021/0189747 A1* | 6/2021 | Pearson, Jr. | B25J 5/007 |
| 2021/0379757 A1* | 12/2021 | Schneider | B66F 11/04 |

FOREIGN PATENT DOCUMENTS

| | | |
|---|---|---|
| JP | 2010-094695 | 4/2010 |
| JP | 2019-126850 | 8/2019 |
| WO | 2011/067260 | 6/2011 |

* cited by examiner

1: EACH SHAFT POSITION [1] 100% POSITIONING
2: STRAIGHT LINE POSITION [2] 6000 mm/s SMOOTH 100 ACCELERATION
⋮

CONTROL DEVICE AND CONTROL METHOD

TECHNICAL FIELD

The present invention relates to a control device and a control method.

BACKGROUND ART

A technique of conveying a workpiece at high speed has been known. In this technique, a sliding articulated shaft (may be hereinafter referred to as a "linear tool") that moves the workpiece linearly in one direction (e.g., in a Y-axis direction) is attached to an end of an arm of a six-axis robot to modify the robot into a seven-axis robot, and the robot and the linear tool are moved in the same direction. For example, see Patent Document 1.

To teach a seven-axis robot system, in general, travel distances of the six-axis robot and the linear tool are specified separately.

Patent Document 1: Japanese Unexamined Patent Application, Publication No. 2019-126850

DISCLOSURE OF THE INVENTION

Problems to be Solved by the Invention

The six-axis robot equipped with the linear tool is generally taught its positions and postures at teaching points while the robot is moving.

Figure 8:
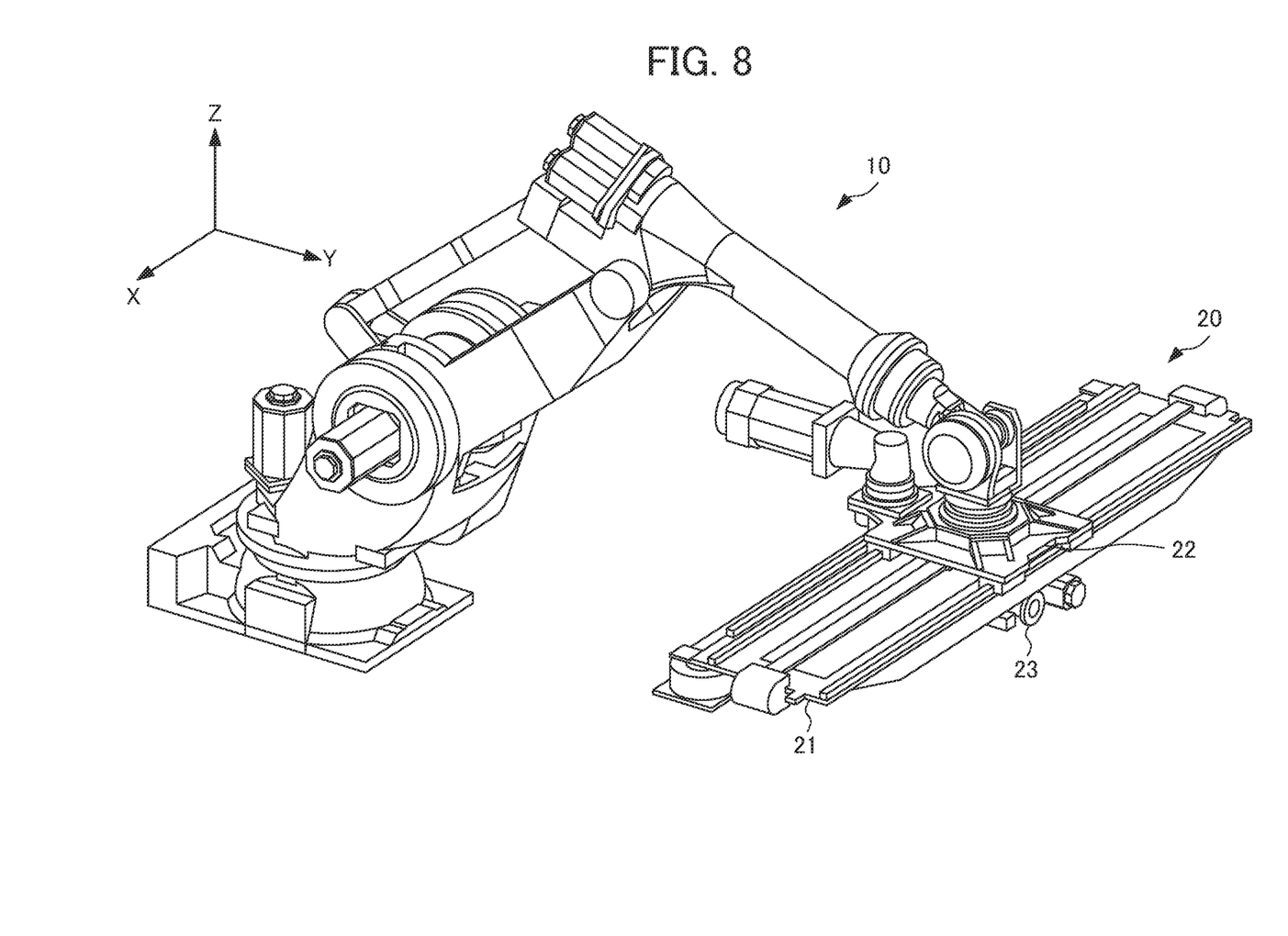
FIG. 8 is a view illustrating an example of a seven-axis robot system having a linear tool attached to an end of an arm of a six-axis robot.

FIG. 8 is a view illustrating an example of the seven-axis robot system having the linear tool attached to the end of the arm of the six-axis robot.

As shown in FIG. 8, a robot 10 is, for example, a six-axis vertically articulated robot, and has a linear tool 20 at an end of its arm. The linear tool 20 is, for example, a conveying tool in the shape of a sliding arm (an articulated shaft), and has a strip-shaped (a rectangular plate-shaped) frame 21, a robot-side slider 22 arranged on an upper surface of the frame 21, and a workpiece-side slider 23 arranged on a lower surface of the frame 21. A tool (not shown) having a plurality of adsorption pads that adsorb the workpiece, for example, is attached to the workpiece-side slider 23, and the linear tool 20 is able to linearly move the workpiece (not shown) adsorbed by the attached tool (not shown) in one direction, i.e., a Y-axis direction.

Figure 9:
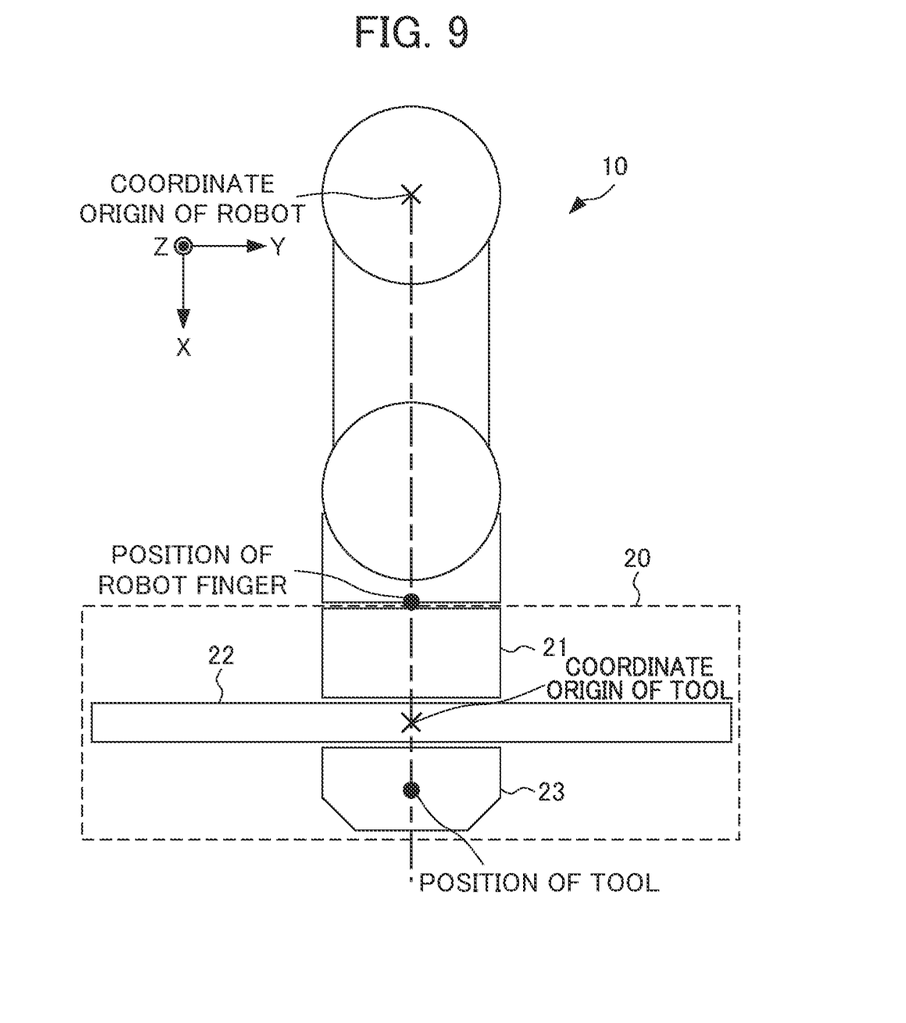
FIG. 9 is a view schematically illustrating an example of positional relationship between the end of the arm of the robot and the linear tool.

FIG. 9 is a view schematically illustrating an example of positional relationship between the end of the arm of the robot 10 and the linear tool 20. FIG. 9 shows, as the robot 10, the end of the arm of the robot 10 (may be hereinafter referred to as a "finger of the robot 10") and other parts of the robot 10 than the finger. In FIG. 9, a coordinate origin of the robot 10, the position of the finger of the robot 10, a coordinate origin of the tool, and the position of the workpiece-side slider 23 of the linear tool 20 are on a straight line in an X-axis direction.

Figure 10:
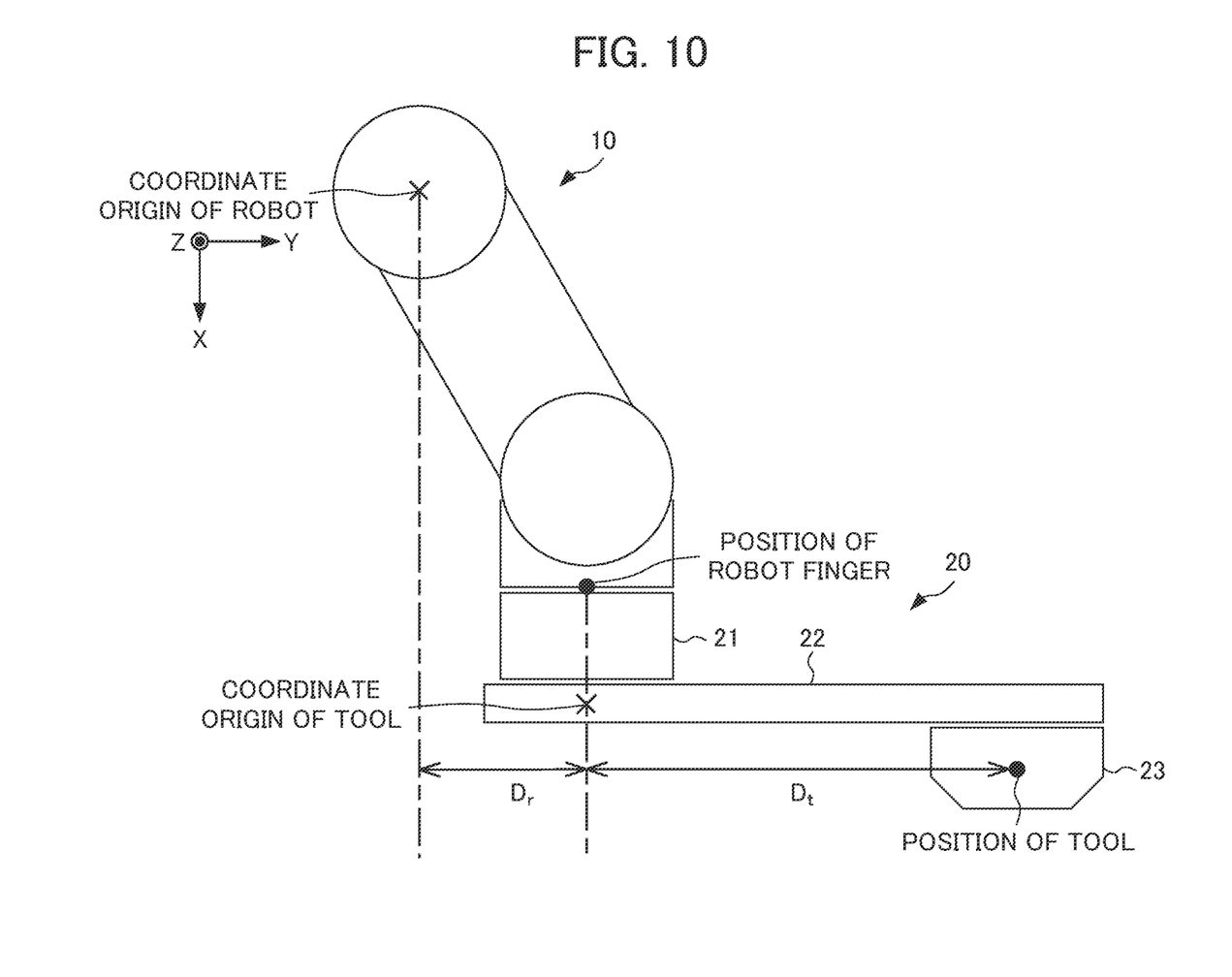
FIG. 10 is a view schematically illustrating an example of the positional relationship when the workpiece-side slider of the linear tool moves in a +Y-axis direction.

FIG. 10 is a view schematically illustrating an example of a positional relationship when the workpiece-side slider 23 of the linear tool 20 moves in a +Y-axis direction.

As shown in FIG. 10, when the workpiece-side slider 23 of the linear tool 20 moves, for example, in the +Y-axis direction, the finger of the robot 10 moves in the +Y-axis direction by a distance $D_r$, which is a finger's travel amount, and the workpiece-side slider 23 moves in the +Y-axis direction by a distance $Dt$, which is a tool's travel amount relative to the coordinate origin of the tool. To create operation programs of the robot 10, an operator needs to examine the finger's travel amount $D_r$ and the tool's travel amount $D_t$ and input a total travel amount $D_{all}$ ($=D_r+D_t$) representing the coordinates of the workpiece-side slider 23 relative to the coordinate origin of the robot 10 (may be hereinafter referred to as "robot and tool's coordinates") and the tool's travel amount Dt.

However, teaching experience is required for the examination of the finger's travel amount $D_r$ and the tool's travel amount $D_r$. If the operator has little experience, the teaching disadvantageously requires more man-hours and longer time.

Under these circumstances, it has been required that the operation programs are created by teaching a single teaching point only, irrespective of the experience of the operator.

Means for Solving the Problems

A control device according to an aspect of the present disclosure controls a robot and an articulated shaft that is attached to an end of an arm of the robot and moves a workpiece in one direction, the control device comprising: an operation program analysis unit configured to calculate a total travel range of the robot and the articulated shaft based on an operation program that sets an initial position of the articulated shaft relative to a coordinate origin of the robot; and a robot/tool travel distance calculation unit configured to set a travel amount that the articulated shaft would be required to take to reach a boundary position of the travel range to a specified value based on the calculated travel range, and calculate a travel amount of the end of the arm of the robot when the articulated shaft has traveled to the boundary position and travel amounts that the articulated shaft and the end of the arm of the robot would be required to take to reach at least one teaching point other than the boundary position.

A control method according to an aspect of the present disclosure controls a robot and an articulated shaft that is attached to an end of an arm of the robot and moves a workpiece in one direction, the control method comprising: an operation program analysis step of calculating a total travel range of the robot and the articulated shaft based on an operation program that sets an initial position of the articulated shaft relative to a coordinate origin of the robot; and a robot/tool travel distance calculation step of setting a travel amount that the articulated shaft would be required to take to reach a boundary position of the travel range to a specified value based on the calculated travel range, and calculating a travel amount of the end of the arm of the robot when the articulated shaft has traveled to the boundary position and travel amounts that the articulated shaft and the end of the arm of the robot would be required to take to reach at least one teaching point other than the boundary position.

Effects of the Invention

According to the aspect, operation programs can be created by teaching a robot a single teaching point only, irrespective of the experience of an operator.

PREFERRED MODE FOR CARRYING OUT THE INVENTION

An embodiment will be described below with reference to the drawings.

<Embodiment>

Figure 1:
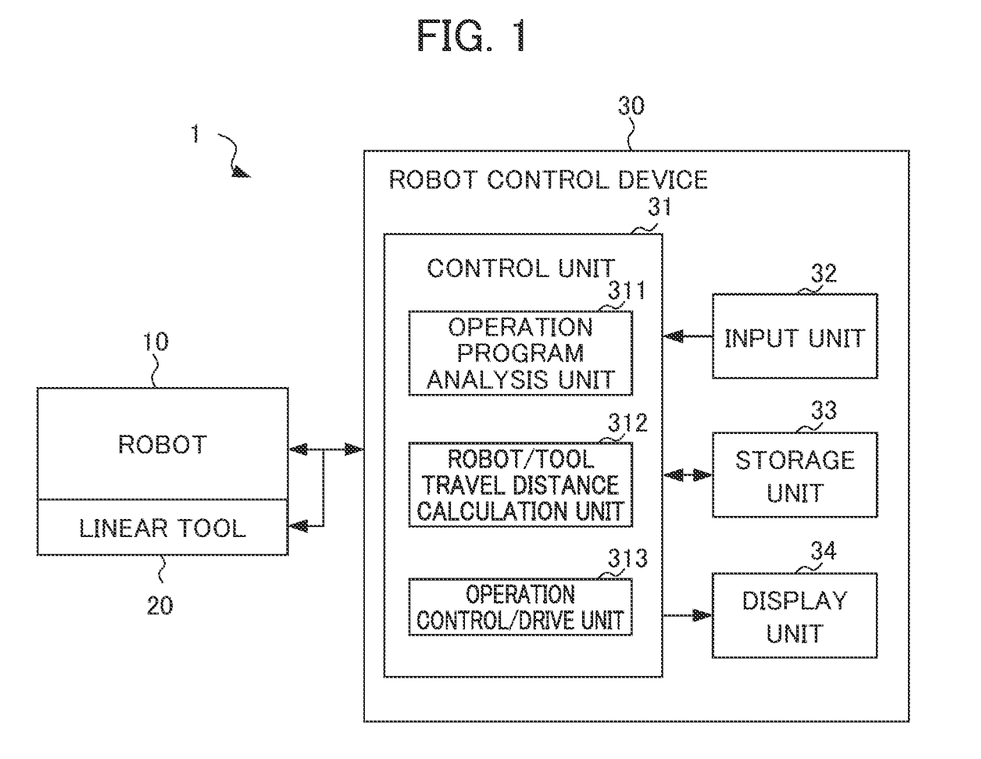
FIG. 1 is a functional block diagram illustrating an example of functional configuration of a robot system according to an embodiment.

FIG. 1 is a functional block diagram illustrating an example of functional configuration of a robot system according to an embodiment. Components having the same functions as the robot 10 and the components of the linear tool 20 shown in FIG. 8 are designated by the same reference numerals, and will not be described in detail below.

As shown in FIG. 1, a robot system 1 includes a robot 10, a linear tool 20, and a robot control device 30. For example, the robot system 1 is used in a factory having many press machines (not shown), and the robot 10 conveys a workpiece between the pressing machines which are not shown using the linear tool 20 based on a control command from the robot control device 30.

The robot 10 and the linear tool 20 may be directly connected to the robot control device 30 via a connection interface which is not shown. The robot 10 and the linear tool 20 may be mutually connected to the robot control device 30 via a network such as a local area network (LAN). In this case, a communication unit which is not shown may be provided for the robot 10 and the linear tool 20, and the robot control device 30 as well, to achieve mutual communication via the connection.

<Robot Control Device 30>

As shown in FIG. 1, the robot control device 30 outputs a drive command to the robot 10 and the linear tool 20 based on an operation program to control the motions of the robot 10 and the linear tool 20. The robot control device 30 may be connected to a teaching console (not shown) which teaches the motions to the robot 10 and the linear tool 20.

As shown in FIG. 1, the robot control device 30 of the present embodiment includes a control unit 31, an input unit 32, a storage unit 33, and a display unit 34. The control unit 31 includes an operation program analysis unit 311, a robot/tool travel distance calculation unit 312, and an operation control/drive unit 313.

The input unit 32 is, for example, a keyboard or a button which is not shown and included in the robot control device 30 or a touch screen of the display unit 34 which will be described later, and receives an input from an operator of the robot control device 30.

The storage unit 33 is, for example, a read only memory (ROM) or a hard disk drive (HDD), and stores programs such as a system program and an application program executed by the control unit 31 which will be described later. The storage unit 33 may store a finger's travel amount $D_r$, which is a travel amount of the finger of the robot 10, and a tool's travel amount $D_t$, which is a travel amount of the workpiece-side slider 23 of the linear tool 20, to teaching points calculated by the robot/tool travel distance calculation unit 312 which will be described later.

The display unit 34 is, for example, a display device such as a liquid crystal display (LCD), and shows a screen such as a screen on which the operation program is created and a screen on which the tool's travel amount $D_t$ of the workpiece-side slider 23 is specified.

<Control Unit 31>

The control unit 31 includes components such as a central processing unit (CPU), a ROM, a RAM, and a complementary metal-oxide-semiconductor (CMOS) memory, which are known in the art and are able to communicate with each other via buses. The CPU is a processor that generally controls the robot control device 30.

The CPU reads the system program and the application program stored in the ROM via the bus, and controls the whole robot control device 30 in accordance with the system program and the application program. Thus, as shown in FIG. 1, the control unit 31 is configured to achieve the functions of the operation program analysis unit 311, the robot/tool travel distance calculation unit 312, and the operation control/drive unit 313. The RAM stores various types of data such as temporary calculation data and display data. The CMOS memory is backed up by a battery which is not shown, and is configured as a nonvolatile memory that stores the data after the power of the robot control device 30 is turned off.

The operation program analysis unit 311 receives, for example, an input of an operation program that sets the coordinates of the workpiece-side slider 23 relative to the coordinate origin of the robot 10 (i.e., the robot and tool's coordinates) from an external device which is not shown, such as a computer, and calculates a total travel range of the robot 10 and the linear tool 20 based on the inputted operation program.

The operation program analysis unit 311 may acquire an operation program created by the input from the operator via the input unit 32.

Figure 2:
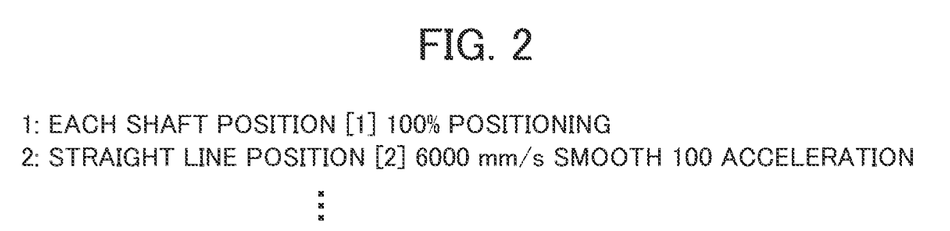
FIG. 2 is a view illustrating an example of an operation program.

FIG. 2 is a view illustrating an example of the operation program. The operation program of FIG. 2 sets, as described above, the robot and tool's coordinates (e.g., the maximum distance that the workpiece-side slider 23 can travel relative to the coordinate origin of the robot 10 or the value specified by the operator) only in "position [1]" corresponding to the teaching point P1.

Figure 3:
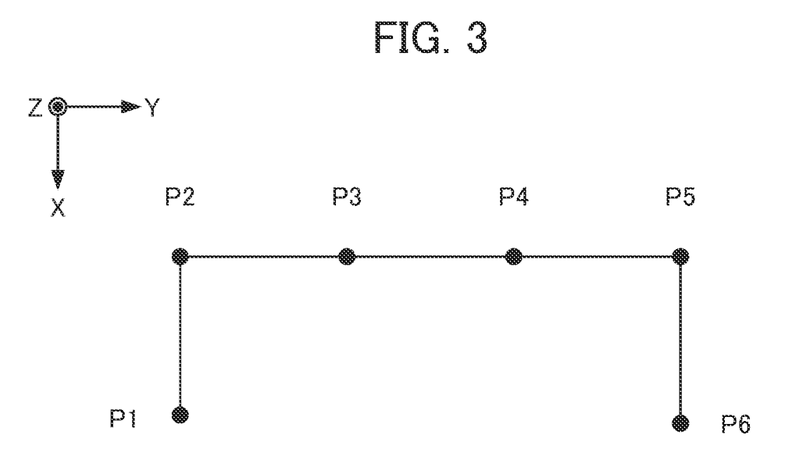
FIG. 3 is a view illustrating an example of a teaching point set in the operation program of FIG. 2.

FIG. 3 is a view illustrating an example of the teaching points set in the operation program of FIG. 2. Specifically, based on the operation program shown in FIG. 2, the robot 10 and the linear tool 20 move from, for example, the teaching point P1 indicating the robot and tool's coordinates to the teaching points P2 to P6 in this order. FIG. 2 only shows "position [1]" and "position [2]" corresponding to the teaching points P1 and P2 of the operation program, but the operation program also includes "position [3]" to "position [6]" corresponding the teaching points P3 to P6.

Figure 4A:
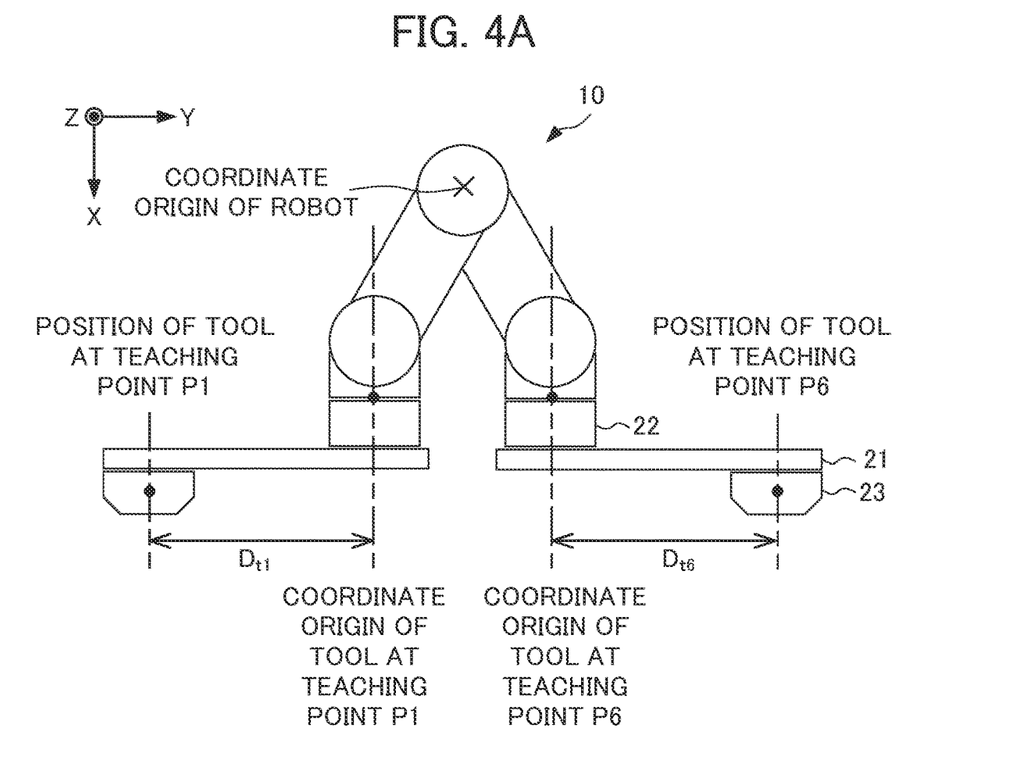
FIG. 4A is a view illustrating an example of positional relationship between a robot finger and a workpiece-side slider of a linear tool at teaching points P1 and P6.
Figure 4B:
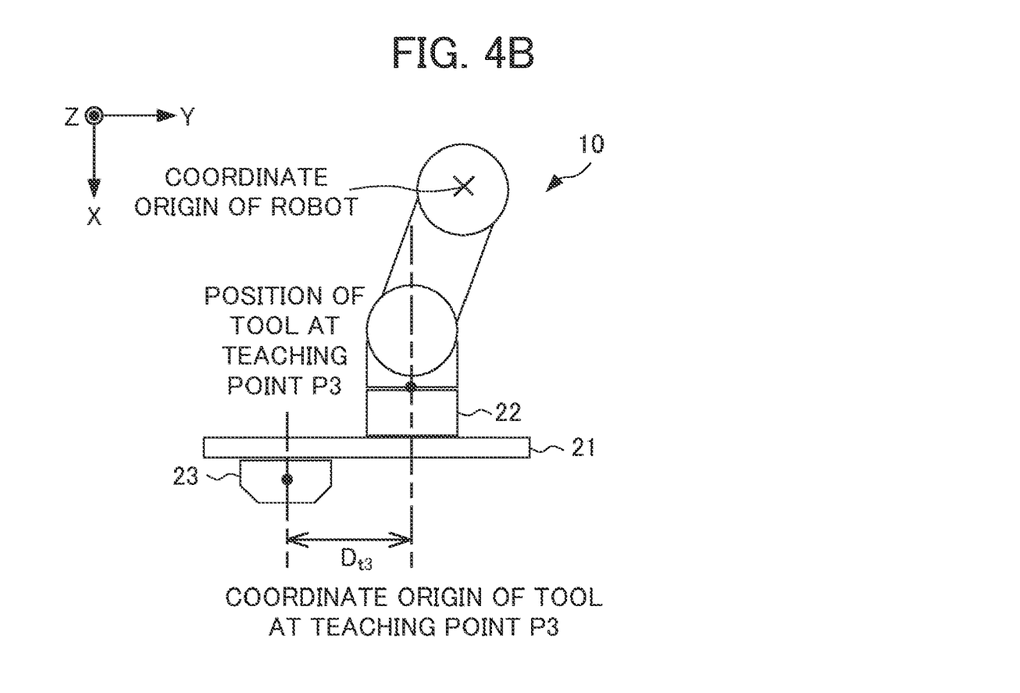
FIG. 4B is a view illustrating an example of positional relationship between the robot finger and the workpiece-side slider of the linear tool at a teaching point P3.

FIG. 4A is a view illustrating an example of positional relationship between the finger of the robot 10 and the workpiece-side slider 23 of the linear tool 20 at the teaching points P1 and P6. FIG. 4B is a view illustrating an example of positional relationship between the finger of the robot 10 and the workpiece-side slider 23 of the linear tool 20 at the teaching point P3. The tool's travel amounts of the workpiece-side slider 23 from the coordinate origin of the tool (the position of the finger of the robot 10) to the teaching points P1, P3, and P6 will be referred to as distances $D_{t1}$, $D_{t3}$, and $D_{t6}$.

The operation program shown in FIG. 2 includes six teaching points, but the number of teaching points may be other than six.

Specifically, the operation program analysis unit 311 analyzes the inputted operation program. Based on the robot and tool's coordinates at the teaching point P1 set in the "position [1]" of the operation program, the operation program analysis unit 311 calculates a travel range from one boundary position that is the teaching point P1 to the other boundary position that is the teaching point P6 as shown in FIG. 4A in an area surrounded by the teaching points P1 to P6 shown in FIG. 3. The one boundary position is the farthest position of the linear tool 20 in the −Y-axis direction, and the other boundary position is the farthest position of the linear tool 20 in the +Y-axis direction.

The robot/tool travel distance calculation unit 312 sets the tool's travel amount that the workpiece-side slider 23 of the linear tool 20 takes to reach each boundary position of the travel range to a specified value based on the calculated travel range, and calculates a travel amount of the finger of the robot when the workpiece-side slider 23 has traveled to each boundary position and a travel amount of the linear tool 20 to each of the teaching points P2 to P5 other than the boundary positions.

Specifically, for example, the robot/tool travel distance calculation unit 312 regards a distance $D_{t1}$ from the coordinate origin of the tool to the coordinates of the workpiece-side slider 23 at the teaching point P1 which is the boundary position and a distance $D_{t6}$ from the coordinate origin of the tool to the coordinates of the workpiece-side slider 23 at the teaching point P6 which is also the boundary position as the tool's travel amounts, and sets the tool's travel amount $D_{t1}$ to a specified value $D_{c1}$, and the tool's travel amount $D_{t6}$ to a specified value $D_{c2}$. The robot/tool travel distance calculation unit 312 may calculate the travel amount of the finger of the robot 10 to the teaching point P1 which is the boundary position from the difference between the robot and tool's coordinates at the teaching point P1 and the specified value $D_{c1}$, and calculate the travel amount of the finger of the robot 10 to the teaching point P6 which is the boundary position from the difference between the robot and tool's coordinates at the teaching point P6 and the specified value $D_{c2}$.

Each of the specified values $D_{c1}$ and $D_{c2}$ may be the maximum travel amount of the workpiece-side slider 23 relative to the coordinate origin of the tool, or may be a travel amount specified by the operator. For example, when the specified values $D_{c1}$ and $D_{c2}$ are the maximum travel amounts of the workpiece-side slider 23 relative to the coordinate origin of the tool, the performance of the linear tool 20 can be maximized.

Next, the robot/tool travel distance calculation unit 312 calculates the tool's travel amount $D_{tn}$ to the teaching points Pn (n=2, 3, 4, and 5) other than the boundary positions P1 and P6 using the formula 1 or 2.

$$D_{tn} = D_{C1} \times \frac{D_{yn}}{D_{max1}} \quad \text{[Formula 1]}$$

$$D_{tn} = D_{C2} \times \frac{D_{yn}}{D_{max2}} \quad \text{[Formula 2]}$$

In the formulae, $D_{max1}$ represents Y-axis coordinates of the teaching point P1 which is the boundary position relative to the coordinate origin of the robot 10, and $D_{max2}$ represents Y-axis coordinates of the teaching point P6 which is the boundary position relative to the coordinate origin of the robot 10. Specifically, $D_{max1}$ is a robot and tool's Y-axis travel amount $D_{Y1}$ which is the maximum travel amount in the −Y-axis direction, and $D_{max2}$ is a robot and tool's Y-axis travel amount $D_{Y6}$ which is the maximum travel amount in the +Y-axis direction. $D_{yn}$ represents the robot and tool's coordinates at the teaching point Pn relative to the coordinate origin of the robot 10 (may be hereinafter referred to as a "Y-axis travel amount").

Figure 5:
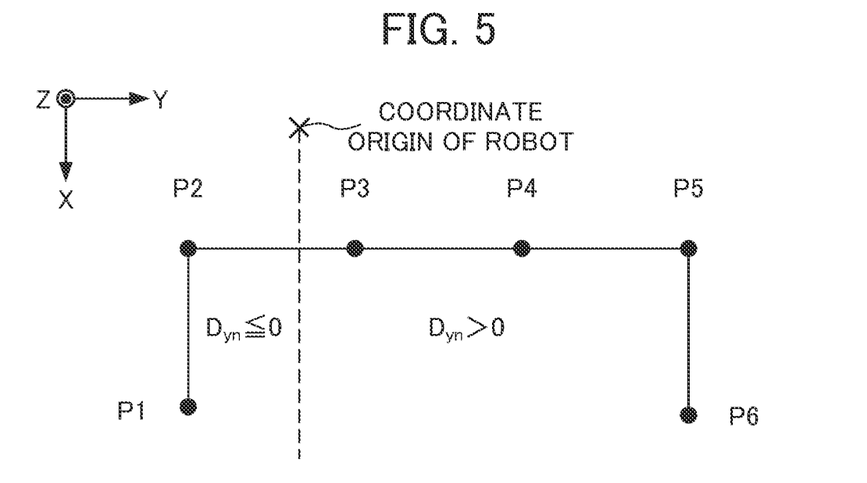
FIG. 5 is a view illustrating an example of relationship between the teaching points and a coordinate origin of the robot.

Specifically, when the robot and tool's Y-axis travel amount $D_{yn}$ to the teaching point Pn is equal to or less than "0" as shown in FIG. 5, the robot/tool travel distance calculation unit 312 calculates the tool's travel amount $D_{tn}$ to the teaching point Pn from the ratio between the Y-axis travel amount $D_{max1}$ to the teaching point P1 and the Y-axis travel amount $D_{yn}$ to the teaching point Pn using the formula 1. For example, when the Y-axis travel amount $D_{max1}$ to the teaching point P1 relative to the coordinate origin of the robot 10 is 1000 mm and the tool's travel amount Dt1 (specified value $D_{c1}$) is 800 mm, the tool's travel amount $D_{t3}$ is 400 mm when the Y-axis travel amount $D_{y3}$ to the teaching point P3 is 500 mm.

When the robot and tool's Y-axis travel amount $D_{yn}$ to the teaching point Pn is greater than "0", the robot/tool travel distance calculation unit 312 calculates the tool's travel amount $D_{tn}$ to the teaching point Pn from the ratio between the Y-axis travel amount $D_{max2}$ to the teaching point P6 and the Y-axis travel amount $D_{yn}$ to the teaching point Pn using the formula 2.

The robot/tool travel distance calculation unit 312 may calculate the travel amount of the finger of the robot 10 to the teaching point Pn other than the boundary positions from the difference between the robot and tool's coordinates at the teaching point Pn other than the boundary positions and the tool's travel amount $D_{tn}$.

The operation control/drive unit 313 sets the travel amounts of the finger of the robot 10 and the tool's travel amounts $D_{tn}$ to the teaching points P2 to P6 calculated by the robot/tool travel distance calculation unit 312 in "position [2]" to "position [6]" of the operation program, and executes the operation program to drive the robot 10 and the linear tool 20.

<Control Processing by Robot Control Device 30>

Control processing by the robot control device 30 of the present embodiment will be described below.

Figure 6:
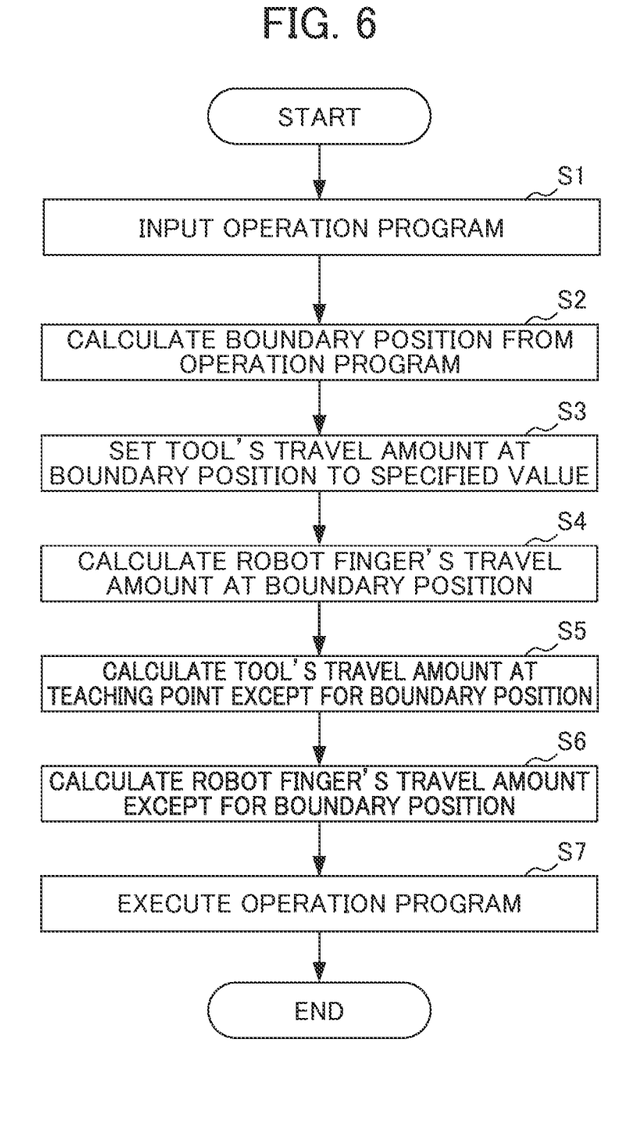
FIG. 6 is a flowchart illustrating control processing by a robot control device.

FIG. 6 is a flowchart illustrating the control processing by the robot control device 30. The processing shown in the flowchart is performed every time the operation program that sets the coordinates of the workpiece-side slider 23 (the robot and tool's coordinates) relative to the coordinate origin of the robot 10 at the teaching point P1 is inputted.

In Step S1, the operation program analysis unit 311 receives an input of the operation program that sets the robot and tool's coordinates at the teaching point P1 from an external device (not shown).

In Step S2, the operation program analysis unit 311 analyzes the inputted operation program and calculates a travel range having the teaching points P1 and P6 as the boundary positions based on the robot and tool's coordinates at the teaching point P1 set in "position [1]" of the operation program.

In Step S3, the robot/tool travel distance calculation unit 312 sets the tool's travel amounts $D_{t1}$ and $D_{t6}$ of the workpiece-side slider 23 to the teaching points P1 and P6 to the specified values $D_{c1}$ and $D_{c2}$.

In Step S4, the robot/tool travel distance calculation unit 312 calculates the travel amount of the finger of the robot 10 to the teaching point P1 which is the boundary position from the difference between the robot and tool's coordinates at the teaching point P1 (Y-axis travel amount $D_{max1}$) and the specified value $D_{c1}$, and calculates the travel amount of the finger of the robot 10 to the teaching point P6 which is the boundary position from the difference between the robot and tool's coordinates at the teaching point P6 (Y-axis travel amount $D_{max2}$) and the specified value $D_{c2}$.

In Step S5, the robot/tool travel distance calculation unit 312 calculates the tool's travel amounts $D_{tn}$ to the teaching points Pn other than the boundary positions P1 and P6 using the formula 1 or 2.

In Step S6, the robot/tool travel distance calculation unit 312 calculates the travel amount of the finger of the robot 10 to each of the teaching points Pn other than the boundary positions P1 and P6 from the difference between the robot and tool's coordinates (Y-axis travel amount $D_{yn}$) at the teaching point Pn other than the boundary positions P1 and P6 and the corresponding tool's travel amount $D_{tn}$.

In Step S7, the operation control/drive unit 313 sets the calculated travel amounts of the finger of the robot 10 to the teaching points P2 to P6 and the calculated tool's travel amounts $D_{tn}$ in "position [2]" to "position [6]" of the operation program, and executes the operation program to drive the robot 10 and the linear tool 20.

As described above, the robot control device 30 of the embodiment receives an input of the operation program that sets the robot and tool's coordinates at the teaching point P1, which is one of the farthest points in the travel range of the workpiece-side slider 23 of the linear tool 20. Based on the robot and tool's coordinates at the teaching point P1, the robot control device 30 calculates the travel amounts of the finger of the robot 10 and the tool's travel amounts to the other teaching points P2 to P6 using the formula 1 or 2, and sets the calculated travel amounts in the operation program. With this robot control device 30, an operator can create the operation program by teaching the single teaching point only, irrespective of the experience of the operator. This allows an operator with little experience in the teaching of the robot and the tool to achieve the teaching easily, saving time and effort of the operator to teach the position of the tool.

The embodiment has just been described above, but the robot control device 30 is not limited to the embodiment described above, and may be modified or improved to the extent that the purpose can be achieved.

<First Variation>

It has been described in the embodiment that the linear tool 20 moves in the Y-axis direction. However, the moving direction is not limited to the Y-axis direction, and the linear tool 20 may move in any direction in an X-Y plane.

<Second Variation>

Figure 7:
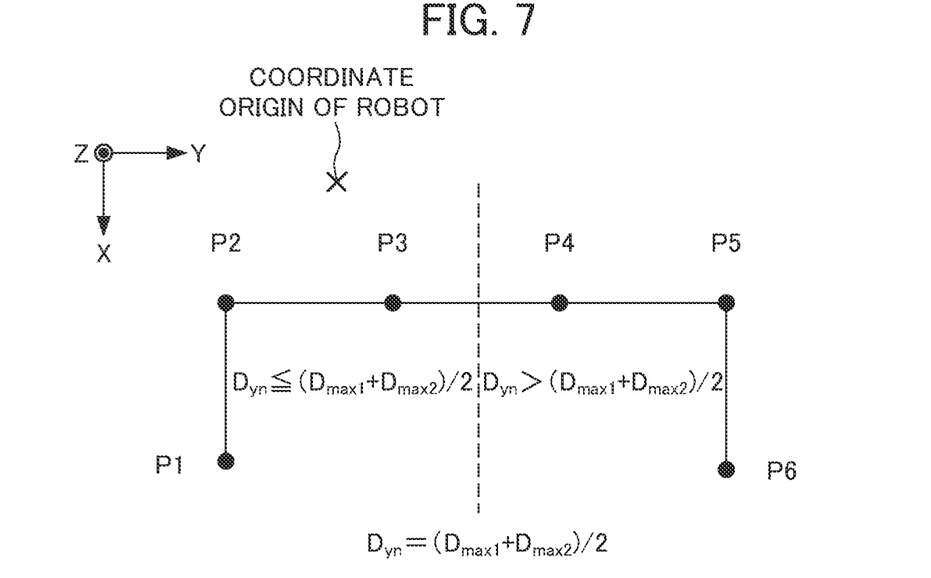
FIG. 7 is a view illustrating an example of relationship between the teaching points and boundary positions.

Although it has been described in the embodiment that the robot/tool travel distance calculation unit 312 calculates the tool's travel amounts $D_{tn}$ to the teaching points Pn other than the boundary positions P1 and P6 using the formula 1 or 2. However, the present invention is not limited to this example. For example, the robot/tool travel distance calculation unit 312 may calculate the tool's travel amounts $D_{tn}$ to the teaching points Pn other than the boundary positions P1 and P6 using the formula 3 or 4. Specifically, when the Y-axis travel amount $D_{yn}$ to the teaching point Pn is equal to or less than $(D_{max1}+D_{max2})/2$ as shown in FIG. 7, the robot/tool travel distance calculation unit 312 calculates the tool's travel amount $D_{tn}$ to the teaching point Pn using the formula 3. Alternatively, when the Y-axis travel amount $D_{yn}$ to the teaching point Pn is more than $(D_{max1}+D_{max2})/2$, the robot/tool travel distance calculation unit 312 calculates the tool's travel amount $D_{tn}$ to the teaching point Pn using the formula 4.

$$D_{tn} = D_{C1} \times \frac{2D_{yn} - D_{max1} - D_{max2}}{D_{max1} - D_{max2}} \quad \text{[Formula 3]}$$

$$D_{tn} = D_{C2} \times \frac{2D_{yn} - D_{max1} - D_{max2}}{D_{max2} - D_{max1}} \quad \text{[Formula 4]}$$

The functions of the robot control device 30 of the embodiment can be implemented by hardware, software, or a combination of the hardware and the software. The expression "the functions are implemented by the software" means that a computer reads and executes a program to implement the functions.

The components of the robot control device 30 can be implemented by hardware including an electronic circuit, software, or a combination of the hardware and the software.

The program is stored in various types of non-transitory computer readable media and supplied to the computer. The non-transitory computer readable media include various types of tangible storage media. Examples of the non-transitory computer readable media include a magnetic recording medium (e.g., a flexible disk, a magnetic tape, and a hard disk drive), a magneto-optical recording medium (e.g., a magneto-optical disk), a compact disc read only memory (CD-ROM), a CD-R, a CD-R/W, and a semiconductor memory (e.g., a mask ROM, a programmable ROM (PROM), an erasable ROM (EPROM), a flash ROM, and a RAM). The program may be supplied to the computer by various types of transitory computer readable media. Examples of the transitory computer readable media include an electric signal, an optical signal, and an electromagnetic wave. The transitory computer readable media can supply the program to the computer via a wired communication channel such as an electric wire and an optical fiber or a wireless communication channel.

The step of writing the program in the recording medium include processes performed chronologically in order, and also include processes that are not necessarily performed chronologically in order, but performed in parallel or individually.

In other words, the disclosed control device and control method can be achieved in the form of various embodiments described below.

(1) The robot control device 30 of the present disclosure is a control device that controls a robot 10 and a linear tool 20 that is attached to an end of an arm of the robot 10 and moves a workpiece in one direction, the control device comprising: an operation program analysis unit 311 configured to calculate a total travel range of the robot 10 and the linear tool 20 based on an operation program that sets an initial position of the linear tool 20 relative to a coordinate origin of the robot 10; and a robot/tool travel distance calculation unit 312 configured to set a travel amount of the linear tool 20 that the linear tool 20 takes to reach a boundary position of the travel range to a specified value based on the calculated travel range, and calculate a travel amount of the end of the arm of the robot 10 when the linear tool 20 has traveled to the boundary position and travel amounts that the linear tool 20 and the end of the arm of the robot 10 would be required to take to reach at least one teaching point Pn other than the boundary position.

With this robot control device 30, an operator can create the operation program by teaching the single teaching point only, irrespective of the experience of the operator.

(2) In the robot control device 30 of aspect (1), the specified value may be the maximum value of a distance that the linear tool 20 is able to travel.

This allows the robot control device 30 to maximize the performance of the linear tool 20.

(3) The robot control device 30 of aspect (1) may further include an input unit 32 configured to receive an input from a user, and the specified value may be a value specified by the user via the input unit 32.

This allows the robot control device 30 to move the robot 10 and the linear tool 20 in any selected travel range.

(4) The robot control device 30 of any one of aspects (1) to (3) may further include an operation control/drive unit 313 configured to set a travel amount of the linear tool 20 and a travel amount of the end of the arm of the robot 10 to reach at least one teaching point other than the calculated boundary position in the operation program, and executes the operation program.

This allows the robot control device 30 to drive the robot 10 and the linear tool 20.

(5) A control method of the present disclosure is a method of controlling a robot 10 and a linear tool 20 that is attached to an end of an arm of the robot 10 and moves a workpiece in one direction, the method comprising: an operation program analysis step of calculating a total travel range of the robot 10 and the linear tool 20 based on an operation program that sets an initial position of the linear tool 20 relative to a coordinate origin of the robot 10; and a robot/tool travel distance calculation step of setting a travel amount of the linear tool 20 that the linear tool 20 would be required to take to reach a boundary position of the travel range to a specified value based on the calculated travel range, and calculating a travel amount of the end of the arm of the robot 10 when the linear tool 20 has traveled to the boundary position and travel amounts that the linear tool 20 and the end of the arm of the robot 10 would be required to take to reach at least one teaching point other than the boundary position.

This control method can provide the same advantages as those of the device of aspect (1).

EXPLANATION OF REFERENCE NUMERALS

1 Robot system
10 Robot
20 Linear tool
21 Frame
22 Robot-side slider
23 Workpiece-side slider
30 Robot control device
31 Control unit
311 Operation program analysis unit
312 Robot/tool travel distance calculation unit
313 Operation control/drive unit
32 Input unit
33 Storage unit
34 Display unit

The invention claimed is:

1. A control device for controlling a robot and an articulated shaft that is attached to an end of an arm of the robot and moves a workpiece in one direction, the control device comprising:
    an operation program analysis unit configured to calculate a travel range of the robot and the articulated shaft based on an operation program that sets an initial position of the articulated shaft relative to a coordinate origin of the robot; and
    a robot/tool travel distance calculation unit configured to set, to a specified value based on the calculated travel range, a travel amount that the articulated shaft would be required to take to reach a boundary position of the travel range, and calculate, from coordinates of the articulated shaft relative to the coordinate origin of the robot when the articulated shaft has traveled to the boundary position and from the specified value, a travel amount of the end of the arm of the robot when the articulated shaft has traveled to the boundary position and travel amounts that the articulated shaft and the end of the arm of the robot would be required to take to reach at least one teaching point other than the boundary position,
    wherein the robot and the articulated shaft are controlled by the control device based on the calculated travel amount of the end of the arm of the robot when the articulated shaft has traveled to the boundary position and the calculated travel amounts that the articulated shaft and the end of the arm of the robot would be required to take to reach at least one teaching point other than the boundary position.

2. The control device of claim 1, wherein the specified value is the maximum value of a distance that the articulated shaft is able to travel.

3. The control device of claim 1, further comprising: an input unit configured to receive an input from a user, wherein
    the specified value is a value specified by the user via the input unit.

4. The control device of claim 1, further comprising: an operation control/drive unit configured to set a travel amount of the articulated shaft and a travel amount of the end of the arm of the robot to reach at least one teaching point other than the calculated boundary position in the operation program, and executes the operation program.

5. A method of controlling a robot and an articulated shaft that is attached to an end of an arm of the robot and moves a workpiece in one direction, the method comprising:
    an operation program analysis step of calculating a travel range of the robot and the articulated shaft based on an operation program that sets an initial position of the articulated shaft relative to a coordinate origin of the robot; and
    a robot/tool travel distance calculation step of setting, to a specified value based on the calculated travel range, a travel amount that the articulated shaft would be required to take to reach a boundary position of the travel range, and calculating, from coordinates of the articulated shaft relative to the coordinate origin of the robot when the articulated shaft has traveled to the boundary position and from the specified value, a travel amount of the end of the arm of the robot when the articulated shaft has traveled to the boundary position and travel amounts that the articulated shaft and the end of the arm of the robot that would be required to take to reach at least one teaching point other than the boundary position, wherein the robot and the articulated shaft are controlled by the control device based on the calculated travel amount of the end of the arm of the robot when the articulated shaft has traveled to the boundary position and the calculated travel amounts that the articulated shaft and the end of the arm of the robot would be required to take to reach at least one teaching point other than the boundary position.

* * * * *